(12) United States Patent
Williams et al.

(10) Patent No.: US 12,350,606 B2
(45) Date of Patent: *Jul. 8, 2025

(54) SYSTEMS, METHODS, AND DEVICES FOR REMOVING CONTAMINANTS FROM STORMWATER

(71) Applicant: Stormtrap, LLC, Romeoville, IL (US)

(72) Inventors: Gregory Williams, London (GB); Dan Fajman, Minooka, IL (US); Robert J. Moran, Caldwell, NJ (US); Luke Matteson, Marseilles, IL (US)

(73) Assignee: Stormtrap, LLC, Romeoville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,316

(22) Filed: Oct. 3, 2023

(65) Prior Publication Data
US 2024/0024800 A1    Jan. 25, 2024

Related U.S. Application Data

(63) Continuation of application No. 17/477,274, filed on Sep. 16, 2021, now Pat. No. 11,801,459.

(51) Int. Cl.
*B01D 21/00* (2006.01)
*B01D 21/02* (2006.01)
(Continued)

(52) U.S. Cl.
CPC ..... *B01D 21/0042* (2013.01); *B01D 21/0051* (2013.01); *B01D 21/02* (2013.01);
(Continued)

(58) Field of Classification Search
CPC ............ B01D 21/0042; B01D 21/0051; B01D 21/02; B01D 17/0208; B01D 17/0211;
(Continued)

(56) References Cited

U.S. PATENT DOCUMENTS

| 863,168 A * | 8/1907 | Griswold ................ B01F 21/20 210/201 |
| 1,190,863 A * | 7/1916 | Corne ................ B01D 21/0003 126/383.1 |

(Continued)

FOREIGN PATENT DOCUMENTS

| CA | 1105847 A * | 7/1981 | ......... B01D 17/0211 |
| FR | 2843312 | 2/2004 | |

OTHER PUBLICATIONS

English Translation of Morin patent publication FR 2843312A1, published Feb. 13, 2004. (Year: 2004).*

(Continued)

*Primary Examiner* — Joseph W Drodge
(74) *Attorney, Agent, or Firm* — GREENBERG TRAURIG LLP

(57) ABSTRACT

A stormwater treatment device may include a chamber having a floor and a wall; an inlet formed in the wall that receives stormwater into an inlet side of the chamber; an outlet formed in the wall that discharges stormwater from an outlet side of the chamber; an enhanced settling device positioned in the outlet side of the chamber; a flow diverter plate in a lower portion of the chamber; and an outlet control diverter positioned proximate to the outlet. Stormwater is received by the inlet in a first flow direction, flows from the inlet side to the lower portion of the chamber in a second flow direction, flows through the enhanced settling device to an upper portion of the chamber in a third flow direction, flows through the outlet control diverter in fourth flow direction, and is discharged by the outlet in a fifth flow direction.

15 Claims, 8 Drawing Sheets

(51) Int. Cl.
*C02F 1/00* (2023.01)
*E03F 5/04* (2006.01)
*E03F 5/14* (2006.01)
*C02F 103/00* (2006.01)

(52) U.S. Cl.
CPC .............. *C02F 1/00* (2013.01); *E03F 5/0403* (2013.01); *E03F 5/14* (2013.01); *C02F 2001/007* (2013.01); *C02F 2103/001* (2013.01)

(58) Field of Classification Search
CPC .............. B01D 17/0214; B01D 21/003; B01D 21/0039; B01D 21/0087; B01D 21/2444; C02F 1/00; C02F 2001/007; C02F 2103/001; E03F 5/0403; E03F 5/0404; E03F 5/14; E03F 5/16; E03F 2201/00
USPC ....... 210/747.2, 801, 802, 170.03, 521, 522, 210/532
See application file for complete search history.

(56) References Cited

U.S. PATENT DOCUMENTS

| | | | | |
|---|---|---|---|---|
| 2,289,669 A * | 7/1942 | Maxton | .................. | B01D 24/04 210/418 |
| 3,491,892 A * | 1/1970 | McCann | ............ | B01D 21/0069 210/521 |
| 3,727,770 A * | 4/1973 | Mochizuki | ............. | B01D 21/02 210/522 |
| 4,123,365 A * | 10/1978 | Middelbeek | ........... | B01D 21/10 210/521 |
| 4,202,778 A * | 5/1980 | Middelbeek | ....... | B01D 17/0211 210/522 |
| 5,028,333 A * | 7/1991 | Wright | ............... | B01D 21/2427 210/522 |
| 5,217,614 A * | 6/1993 | Meurer | .............. | B01D 21/0051 210/538 |
| 6,919,033 B2 | 7/2005 | Stark et al. | | |
| 7,718,056 B2 | 5/2010 | Bonnerup | | |
| 7,722,763 B2 | 5/2010 | Benty et al. | | |
| 8,865,006 B2 * | 10/2014 | Ford | .................. | B01D 21/0003 210/801 |
| 8,894,866 B1 * | 11/2014 | Belasco | .................... | E03F 5/10 210/170.03 |
| 9,650,268 B2 | 5/2017 | Barnier et al. | | |
| 10,287,769 B2 | 5/2019 | Fink et al. | | |
| 10,918,975 B1 | 2/2021 | Happel | | |
| 11,801,459 B2 * | 10/2023 | Williams | ............ | B01D 21/0042 |
| 12,000,134 B2 * | 6/2024 | Williams | .................. | E03F 5/14 |
| 2004/0251218 A1 * | 12/2004 | Giordani | ............ | B01D 21/2427 210/800 |
| 2013/0037494 A1 * | 2/2013 | Cook | ................. | B01D 21/0057 210/800 |
| 2015/0027963 A1 * | 1/2015 | Onstad | ............... | B01D 21/0051 210/801 |
| 2015/0129473 A1 * | 5/2015 | Kent | ......................... | E03F 5/14 210/170.03 |
| 2019/0078310 A1 * | 3/2019 | Kent | .................... | B01D 21/245 |

OTHER PUBLICATIONS

International Search Report, dated Feb. 28, 2022, from corresponding International Application No. PCT/US2021/072664.
Written Opinion of the International Searching Authority, dated Feb. 28, 2022, from corresponding International Application No. PCT/US2021/072664.

* cited by examiner

SYSTEMS, METHODS, AND DEVICES FOR REMOVING CONTAMINANTS FROM STORMWATER

RELATED APPLICATIONS

This application is a continuation of U.S. patent application Ser. No. 17/477,274, now U.S. Pat. No. 11,801,459, filed Sep. 16, 2021, the disclosure of which is hereby incorporated, by reference, in its entirety.

BACKGROUND OF THE INVENTION

1. Field of the Invention

The present disclosure relates generally to systems, methods, and devices for removing contaminants from stormwater.

2. Description of the Related Art

When it rains, stormwater travels over a variety of surfaces before it reaches a sewer. Along its path, the stormwater picks up and suspends contaminants, both natural and man-made, and carries the contaminants to the sewer. The sewer provides a first opportunity to remove some of these contaminants from the stormwater before the stormwater continues its journey to a body of water.

SUMMARY OF THE INVENTION

Systems, methods, and devices for removing contaminants from stormwater are disclosed.

According to an embodiment, a stormwater treatment device may include a chamber having a floor and a wall; an inlet formed in the wall that receives stormwater into an inlet side of the chamber; an outlet formed in the wall that discharges stormwater from an outlet side of the chamber; a vertical baffle that divides at least a portion of the chamber into the inlet side and the outlet side, wherein the inlet side and the outlet side are in fluid communication; an enhanced settling device positioned in the outlet side of the chamber, wherein a portion of the chamber below a bottom of the enhanced settling device defines a lower portion of the chamber, and a portion of the chamber above a top of the enhanced settling device defines an upper portion of the chamber; a flow diverter plate in the lower portion of the chamber; and an outlet control diverter positioned proximate to the outlet; wherein stormwater is received by the inlet in a first flow direction, flows from the inlet side to the lower portion of the chamber in a second flow direction, flows through the enhanced settling device to an upper portion of the chamber in a third flow direction, flows through the outlet control diverter in fourth flow direction, and is discharged by the outlet in a fifth flow direction.

In one embodiment, the stormwater treatment device may also include one or more vanes positioned on the vertical baffle, wherein the plurality of vanes extend into the inlet side of the chamber.

In one embodiment, a horizontal vane may be positioned on the vertical baffle, and may extend into the inlet side of the chamber. In addition, a plurality of vertical vanes may be provided, and the vertical vanes may extend from the ends of the horizontal vane.

In one embodiment, the enhanced settling device may include a plurality of tubes and each tube is positioned at an angle from the wall toward the vertical baffle. In one embodiment, the angle may be different for each tube, for a plurality of tubes, etc.

In one embodiment, the enhanced settling device may include a plurality of tubes, and a first subset of the plurality of tubes is positioned at a first angle to the horizontal, and a second subset of the plurality of tubes is positioned at a second angle to the horizontal.

In one embodiment, a top of the enhanced settling device may be below a lower surface of the outlet control diverter.

In one embodiment, stormwater having a flow rate above a certain value flows over the vertical baffle.

In one embodiment, the outlet control diverter may include a bottom piece and two vertical side pieces, wherein an opening for receiving stormwater is defined by the bottom piece, at least one of the vertical side pieces, and the wall.

In one embodiment, the changes in flow direction optimize a time the stormwater spends in the chamber.

In one embodiment, the chamber may be cylindrical.

According to another embodiment, a method for removing suspended contaminants from stormwater may include: (1) receiving, at an inlet of a stormwater treatment device, stormwater containing suspended contaminants, wherein the stormwater flows into an inlet side of the stormwater treatment device and a fluid velocity of the stormwater decreases; (2) receiving, in a lower portion of the stormwater treatment device, the stormwater; (3) receiving, in an enhanced settling device, the stormwater from the lower portion, wherein the stormwater changes direction to flow up the enhanced settling device into an upper portion of the chamber on an outlet side of the chamber; (4) receiving, at an outlet control diverter, the stormwater from the upper portion, wherein the stormwater changes direction to be received by the outlet control diverter; and (5) discharging, at an outlet, the stormwater.

In one embodiment, the enhanced settling device may include a plurality of tubes, and a first subset of the plurality of tubes is positioned at a first angle to the horizontal, and a second subset of the plurality of tubes is positioned at a second angle to the horizontal.

In one embodiment, a top of the enhanced settling device may be below a lower surface of the outlet control diverter.

In one embodiment, stormwater having a flow rate above a certain value flows over a vertical baffle into the upper portion of the stormwater treatment device.

In one embodiment, the outlet control diverter may include a bottom piece and two vertical side pieces, wherein an opening for receiving stormwater is defined by the bottom piece, at least one of the vertical side pieces, and the wall.

In one embodiment, the changes in flow direction optimize a time the stormwater spends in the chamber.

In one embodiment, the chamber may be cylindrical.

According to another embodiment, a system for removing contaminants from stormwater may include a chamber with a horizontal floor and vertical walls attached to the floor, where the chamber walls form a cylinder and the inlet and outlet are on opposite side of the cylinder; an inlet in one wall for receiving contaminated stormwater and an outlet in the wall for discharging treated stormwater; a vertical baffle in the chamber that is perpendicular to the vertical plane bisecting the inlet and which divides the chamber into an inlet side and an outlet side, where the outlet side is between the baffle and the outlet opening and the inlet side is between the baffle and the inlet opening, the two sides being in fluid communication; a stack of lamellar tubes positioned in the outlet side, where the long axis of each tube is at an angle to horizontal approximately perpendicular to the vertical plane bisecting the inlet, where the top of the stack of tubes is at least 6 inches below the invert of the outlet; one or more flow diversion plates attached to the walls of the chambers on the outlet side below the stack of lamellar tubes; and a flow diverter placed at the entrance to the outlet.

In one embodiment, the walls of the chamber may form a rectangular prism structure.

In one embodiment, the angle between the vertical plane bisecting the inlet and a vertical plane bisecting the outlet is between 45 and 315 degrees.

In one embodiment, the top of the vertical baffle is at a level above the invert of the inlet pipe such that at flow rates exceeding the design flow rate water will pass over top of the vertical baffle.

In one embodiment, the bottom of the vertical baffle is at least 2 feet from the bottom of the chamber.

In one embodiment the vertical baffle may have one or more vanes extending perpendicular from the baffle towards the inlet.

In one embodiment the at least two vanes may extend 1-5" from the baffle

In one embodiment the at least two vanes are placed 3-6" from the point where the baffle meets the wall of the tank on each side of the baffle such the arrangement of vanes is symmetrical about a vertical plane bisecting the inlet.

In one embodiment, the long axis of each tube is at an angle of 50 to 70 degrees from horizontal and the direction of this angle is between 45 and 135 degrees to the vertical plane bisecting the inlet.

In one embodiment, where the bottom of the stack of lamellar tubes is above the bottom of the vertical baffle.

In one embodiment, the flow diversion plates are planar and at least one plate is attached to the wall below the outlet such that the plate has the same centerline as the outlet and the plate forms an angle of between 45 degrees to 135 degrees from horizontal. Second flow diversion plates may be attached to the wall in the direction of the angle of the lamellar tubes such that the centerline of the plate coincides with the centerline of the wall. Third flow diversion plates may be attached to the wall opposite the second flow diversion plate such that the centerline of the plate coincides with the centerline of the wall. The second and third flow diversion plates may or may not be at the same angle to horizontal as the first diversion plate, within the range of 45 to 135 degrees. In one embodiment, more than one flow diversion plates may be manufactured as a single piece.

In one embodiment, the sagitta of each diversion plate may be between 3 and 14 inches.

In one embodiment, the flow diverter at the outlet may include a horizontal bottom piece at the same elevation as the outlet invert and two vertical side pieces, a first vertical side piece projecting from one side of the outlet opening, parallel to a vertical plane bisecting the outlet and a second vertical side piece substantially perpendicular to the first vertical side piece and parallel to a tangent to the chamber wall at the midpoint of the outlet, the bottom piece and two vertical side pieces forming an opening through which water can reach the outlet opening.

In one embodiment, the second vertical side piece may be curved.

In one embodiment, the flow diverter at the outlet may include a first vertical side piece projecting at least 6 inches from one side of the outlet opening and a second vertical side piece at least 8 inches in length. The flow diverter at the outlet may include two vertical side pieces projecting at least 4 inches up from the horizontal side piece.

In one embodiment, the flow diverter at the outlet may include an opening through which water can reach the outlet opening that is on the opposite side of the outlet side from the angle of the lamellar tubes such that water flowing through the tubes must reverse direction at least twice in order to enter the opening in the flow diverter.

In one embodiment, the flow diverter at the outlet may include an opening through which water can reach the outlet opening that is at least 6 inches wide.

BRIEF DESCRIPTION OF THE DRAWINGS

For a more complete understanding of the present disclosure, the objects and advantages thereof, reference is now made to the following descriptions taken in connection with the accompanying drawings in which.

DETAILED DESCRIPTION OF PREFERRED EMBODIMENTS

Figure 1:
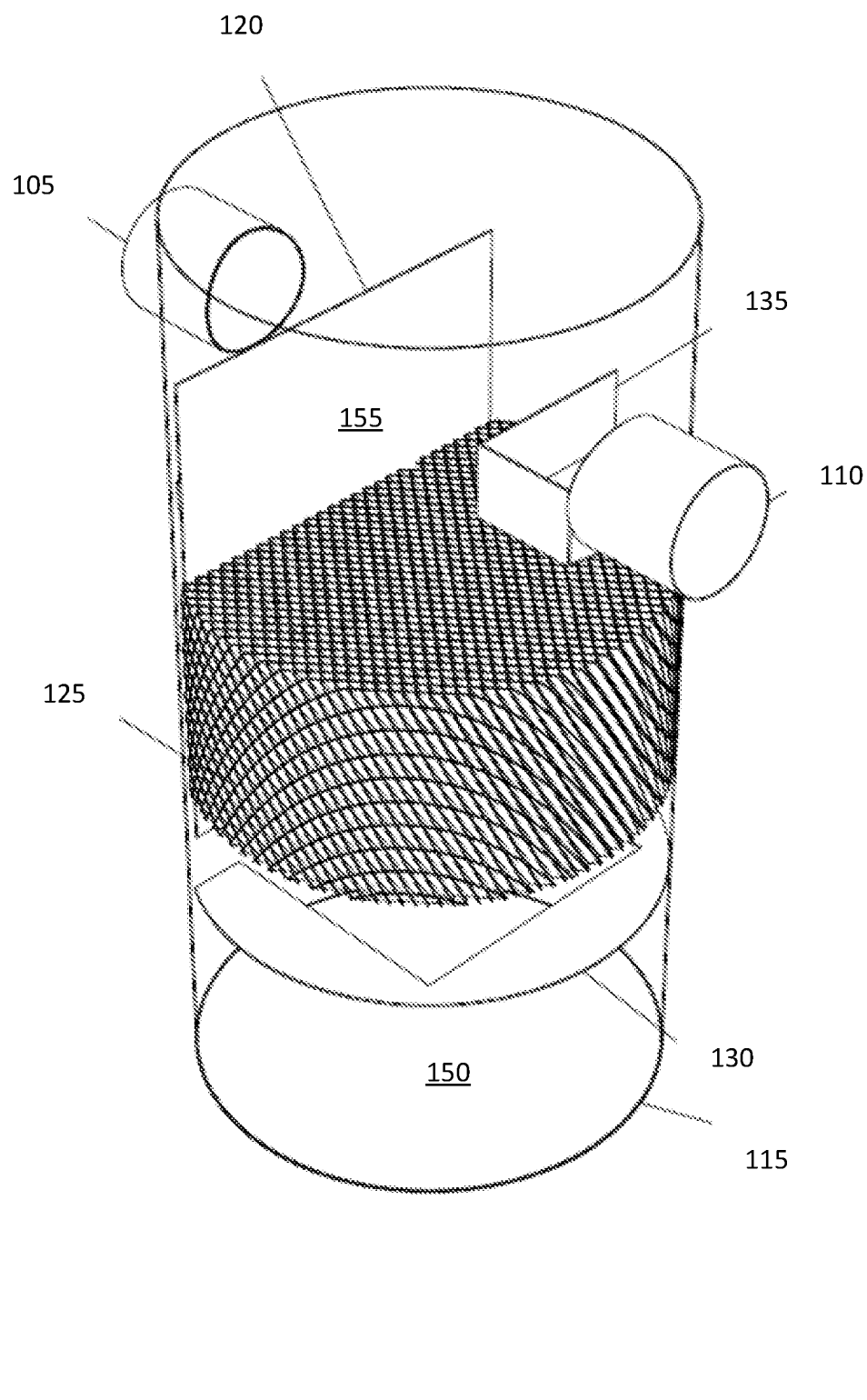
FIG. 1 depicts an isometric view of a stormwater treatment device according to an embodiment.

Embodiments are directed to system for removing contaminants from stormwater. Referring to FIGS. 1-8, views of a stormwater treatment device are provided according to an embodiment.

Stormwater treatment device 100 may define a chamber including inlet 105, outlet 110, wall 115, vertical baffle 120, one or more flow diverters 130, and outlet control diverter 135. In one embodiment, stormwater carrying contaminants may enter inlet 105 and may flow to lower portion 150 of stormwater treatment device 100. In one embodiment, depending on the inflow speed of the stormwater, the stormwater may hit vertical baffle 120, slow, and flow downward.

In one embodiment, the distance of vertical baffle 120 from inlet 105 may be a balance between having more elements in enhanced settling device 125 and having an opening to allow for cleaning and servicing. A smaller distance may provide better performance, but may make cleaning and servicing more difficult. In addition, a smaller distance may also increase scour.

In one embodiment, vertical baffle 120 may be positioned and/or sized such that the top of vertical baffle 120 is at an elevation above the invert of the on inlet 105 such that a flow rates exceeding the design flow rate, stormwater will pass over the top of vertical baffle 120.

Vertical baffle 120 may divide the chamber defined by stormwater treatment device 100 into an inlet side and an outlet side.

In one embodiment, a bottom of vertical baffle 120 may be positioned to optimize the flow of water in the lower portion 150 of stormwater treatment device 100 and may depending on the size of stormwater treatment device 100. In one embodiment, the bottom of vertical baffle 120 may be at least two feet from the bottom of stormwater treatment device 100. Other placements may be used as is necessary and/or desired.

The stormwater may continue from lower portion 150 of stormwater treatment device 100 to upper portion 155 of stormwater treatment device. In one embodiment, enhanced settling device 125, such as lamellar tubes, may be positioned between lower portion 150 and upper portion 155.

In embodiments, enhanced settling device 125 may comprise a plurality of sheets, with each sheet formed with ridges at an angle. In one embodiment, the sheets may be placed so that the ridges in adjacent sheets are parallel, forming tubes positioned at an angle to the vertical. In another embodiment, the sheets may be placed such that the ridges in adjacent sheets are perpendicular, creating a series of tortuous paths.

In one embodiment, the bottom of enhanced settling device 125 may be above the bottom of vertical baffle 120.

One or more flow diverter 130, 131, and 132 may be provided in lower portion 150 of stormwater treatment device 100 and may divert the flow of the untreated stormwater so that the suspended contaminants have more time to fall out of suspension. In one embodiment, flow diverters 130, 131, and/or 132 may further prevent inflowing untreated stormwater from re-suspending the contaminants.

In one embodiment, flow diverters 130, 131, and/or 132 may be plates. In one embodiment, the plates may be planar. In one embodiment, a second flow diverter (131) may be attached to wall 115 in the direction of the angle of the lamellar tubes such that the centerline of the second flow diverter coincides with the centerline of wall 115. A third flow diverter 132 may be attached to wall 115 opposite the second flow diverter 131 such that the centerline of the third flow diverter coincides with the centerline of the wall 115. Two or more of the flow diverters may be manufactured as a single piece. The sagitta of each flow diverter may be between 3 inches and 30% of the distance to the opposite wall or baffle. For example, 14 inches may be the upper limit for a 48" diameter tank.

Outlet control diverter 135 may further restrict the flow of the stormwater before it can exit outlet 110. In one embodiment, outlet control diverter may prevent stormwater from flowing directly from lower portion 150 to upper portion 155 and out of outlet 110 without a change of flow direction. Outlet control diverter 135 may further cause suspended contaminants to fall out of suspension.

Outlet control diverter 135 may be planar, and may be attached to wall 115 below outlet 110 such that outlet control diverter 135 plate has the same centerline as outlet 110, and outlet control diverter 135 forms an angle of 45 degrees to 135 degrees from horizontal.

Outlet control diverter 135 may include a horizontal bottom piece at the same elevation as outlet 110 invert and two vertical side pieces. The first vertical side piece may project from one side of outlet 110 and may be substantially parallel to a vertical plane bisecting outlet 110. The second vertical side piece may be substantially perpendicular to the first vertical side piece and parallel to a tangent off the wall 115 taken at the centerline of the outlet. The bottom piece and two vertical side pieces form an opening through which water can reach outlet 110. In one embodiment, each vertical side piece may project at least 4 inches from the horizontal side piece.

While the dimensions of outlet control diverter 135 and its parts may vary based on the size of stormwater treatment device 100, in one embodiment, the first vertical side piece may project at least 6 inches from one side of outlet 110, and the second vertical piece may be at least 8 inches in length. The dimensions may vary with the size of stormwater treatment device 100, with, in general, larger devices having larger elements, and smaller devices having smaller elements. In one embodiment, the second vertical side piece may be curved. The size of the side pieces may be selected to maximize the path length to outlet 110 while still staying close to the size of outlet 110.

In one embodiment, the largest dimension perpendicular to a vertical plane bisecting inlet 105 may be equal to or less than the largest dimension parallel to the vertical plane bisecting inlet 105. For example, the length between inlet 105 and outlet 110 may be greater than the width of the chamber. This may be useful, for example, if the chamber is rectangular in shape. The angle between the vertical plane bisecting inlet 105 and a vertical plane bisecting outlet 110 may be between 45 and 315 degrees. Other angles may be used as is necessary and/or desired.

Figure 7:
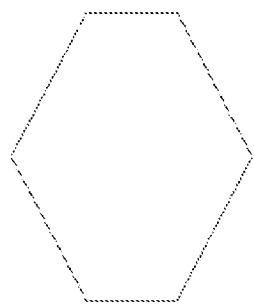
FIG. 7 depicts a cross-section view of a lamellar tube according to one embodiment.
Figure 8:
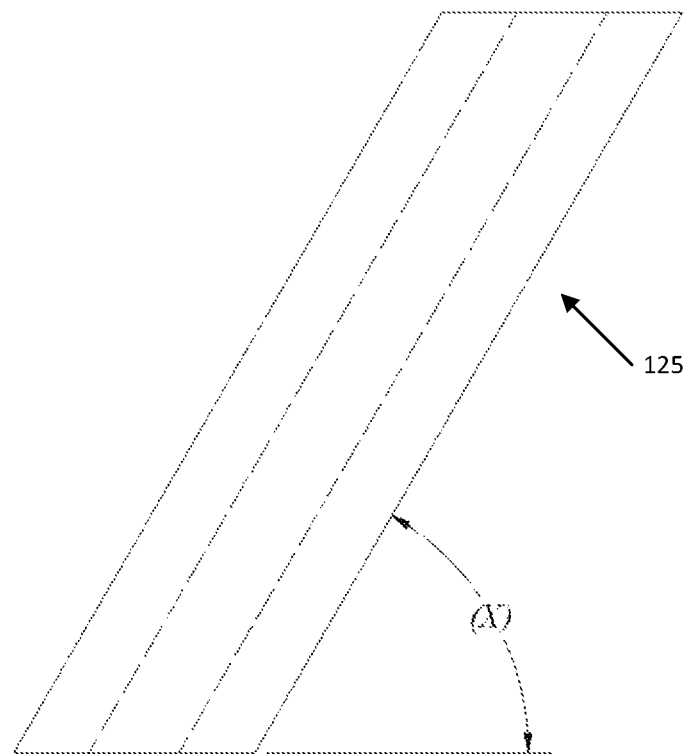
FIG. 8 depicts a side view of a lamellar tube according to one embodiment.

Referring to FIGS. 7 and 8, exemplary details on enhanced settling device 125 are provided according to embodiments. Enhanced settling device 125 may include a plurality of lamellar tubes. The lamellar tubes may have any suitable shape; in one embodiment, as illustrated in FIG. 7, the lamellar tubes may have a hexagonal shape. Other tube shapes, such as rectangles, parallelograms, circles, etc. may be used as well. In one embodiment, the dimensions of each tube may be selected to minimize the height of each channel provided by the tubes, which minimizes the settling distance.

In one embodiment, the lamellar tubes in enhanced settling device 125 may be positioned at an angle from the horizontal. In one embodiment, water flowing through enhanced settling device 125 must reverse direction at least twice in order to enter the opening in outlet control diverter 135. For example, the storm water reverses direction in travelling from lower portion 150 to upper portion 155 via enhanced settling device 125, and again from enhanced settling device 125 to outlet 110. Outlet diverter 135 may require still another change of direction.

In one embodiment, the angle may be selected to optimize settling versus self-cleaning of the tubes in enhanced settling device 125. For example, the angle may be between 45 and 75 degrees. Other angles may be used as is necessary and/or desired.

In one embodiment, the lamellar tubes in enhanced settling device 125 may be positioned at different angles to the horizontal. For example, a first subset of lamellar tubes may be positioned at a first angle to the horizontal, a second subset of lamellar tubes may be positioned at a second angle to the horizontal, etc. The angle(s) may be selected as is necessary and/or desired.

Figure 2B:
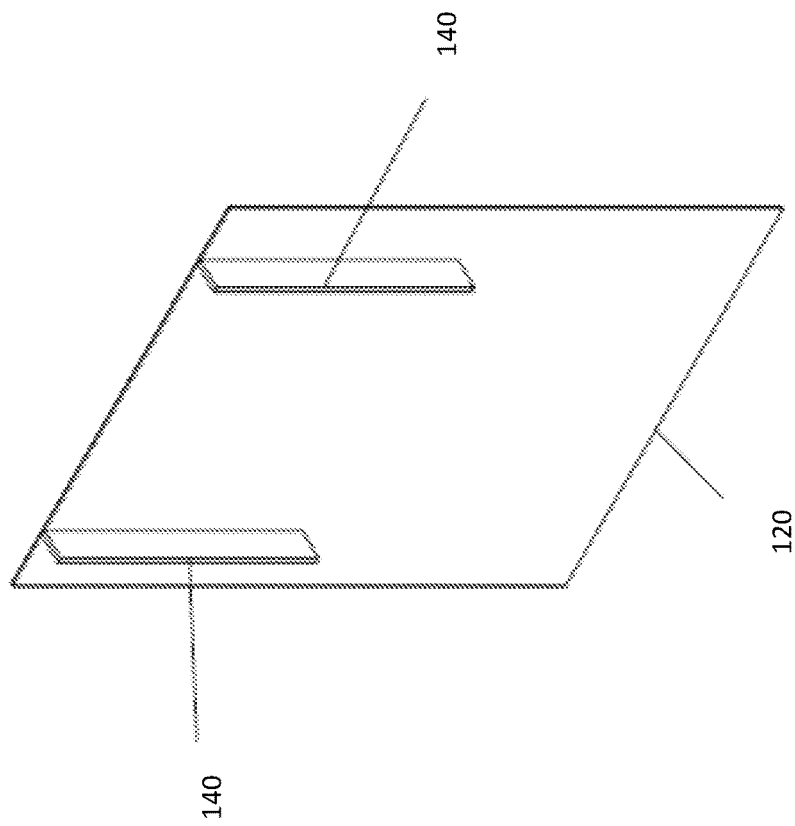
FIGS. 2A and 2B depict exemplary vane implementations according to embodiments.
Figure 2A:
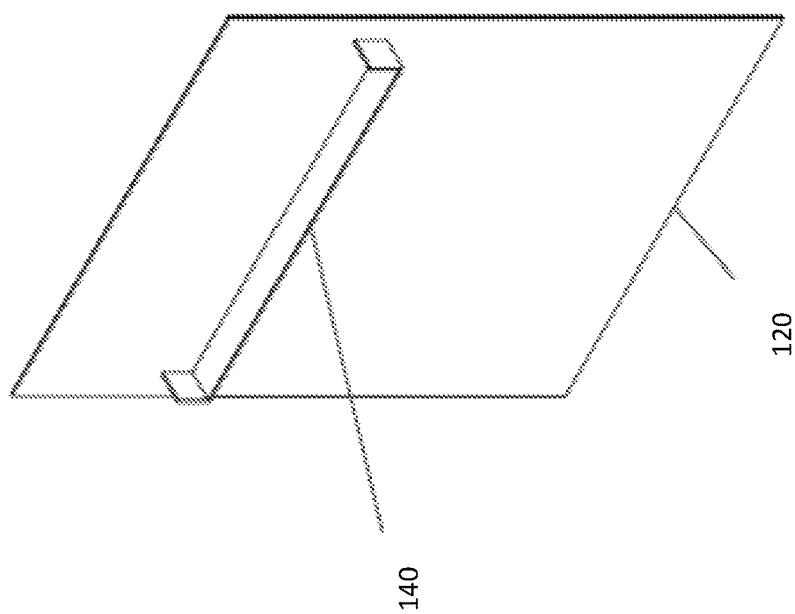
Figure 4:
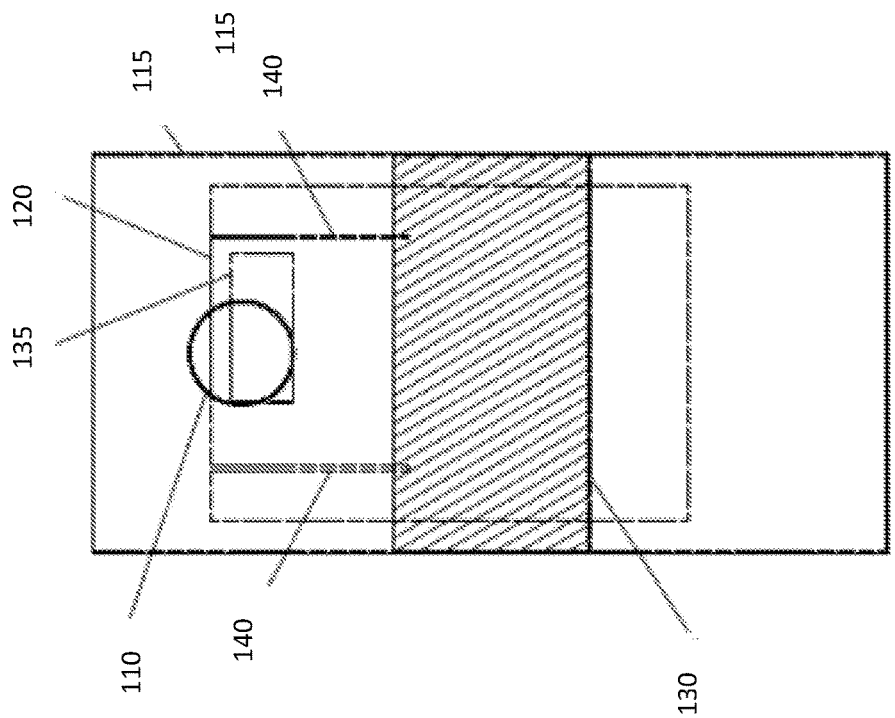
FIG. 4 depicts a front elevation view of the stormwater treatment device of FIG. 1 according to an embodiment.
Figure 3:
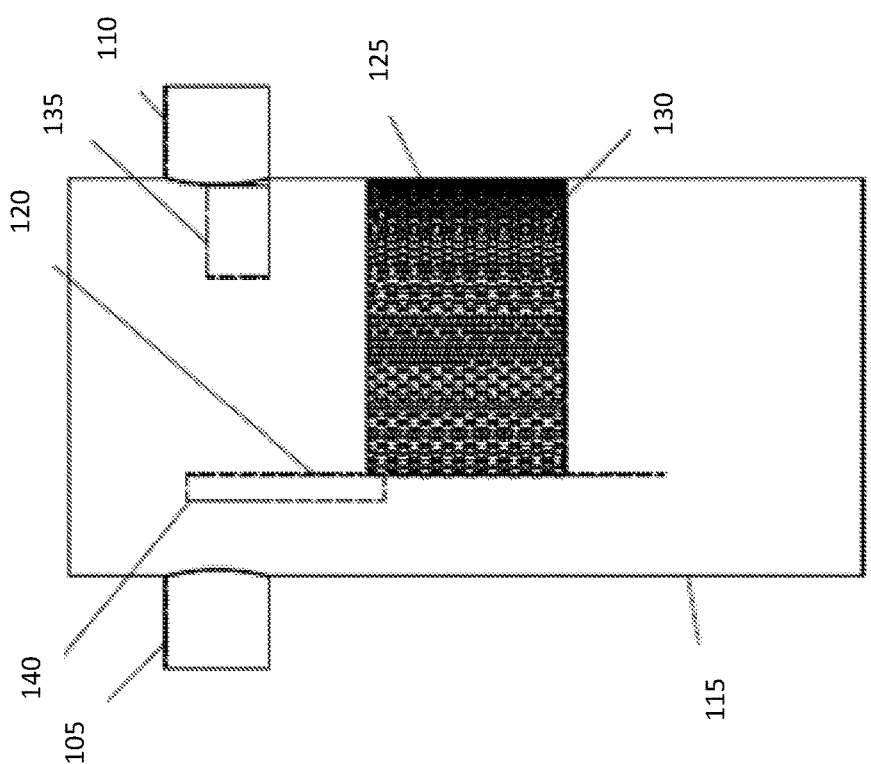
FIG. 3 depicts a side elevation view of the stormwater treatment device of FIG. 1 according to an embodiment.
Figure 5:
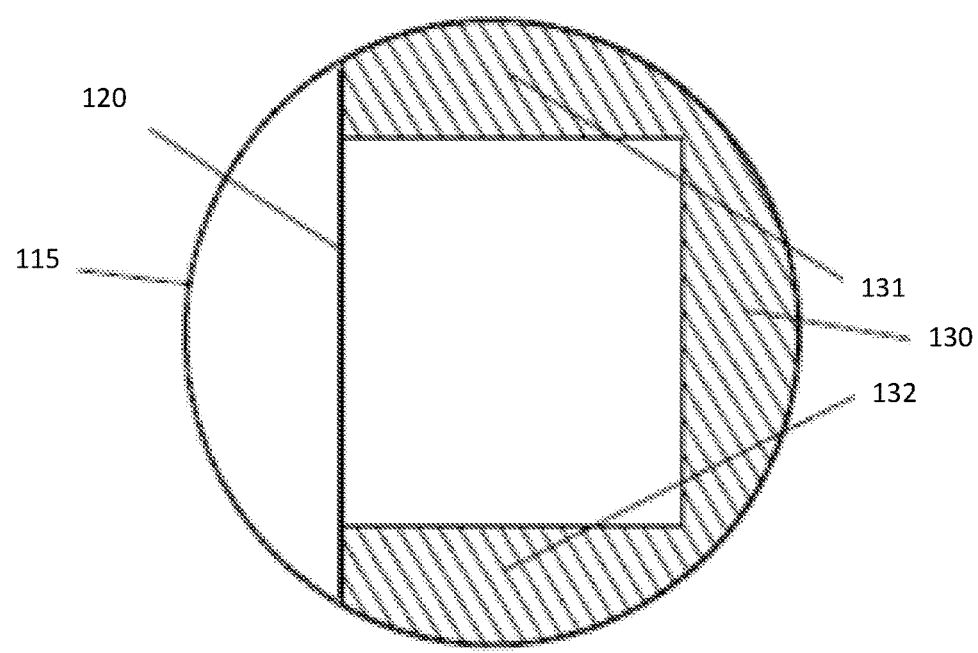
FIG. 5 depicts a plan view of a first, second, and third flow diverters according to an embodiment.
Figure 6:
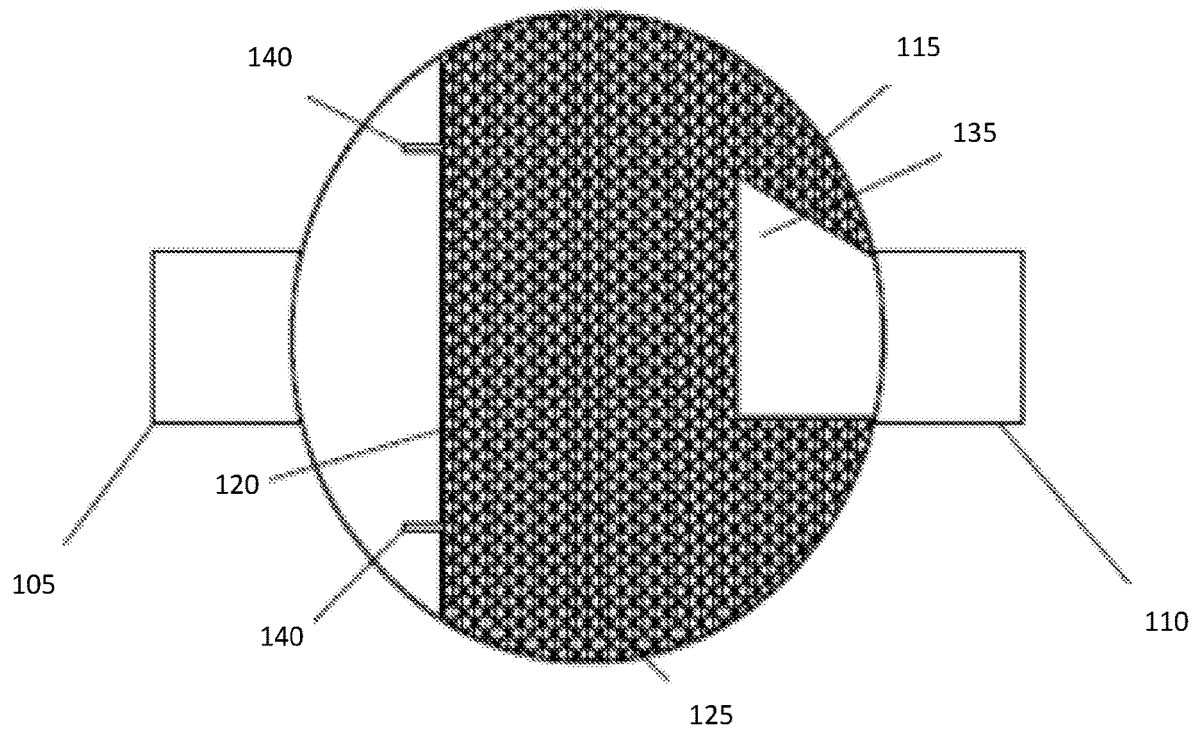
FIG. 6 depicts a plan view of the stormwater treatment device of FIG. 1 according to an embodiment.

In one embodiment, as shown in FIG. 2A, vertical baffle 120 may include one or more vanes 140 that may extend down from the top of vertical baffle 120 on the inlet side that help prevent the formation of vortices in the flow on the inlet side. For example, vanes 140 may extend from 12-36" below the top of vertical baffle 120 at a distance from 1-5" out from the baffle. The dimensions of vanes 140 may vary depending on the size of stormwater treatment device 100. In one embodiment, at least one vane 140 may be positioned at least 3" from the point where the baffle 120 meets the wall of stormwater treatment device 100 while the other vane 140 may be positioned at least 3" from the point where the other side of the baffle 120 meets the wall of stormwater treatment device 100. Any arrangement of vanes 140 may be symmetrical about a vertical plane bisecting and perpendicular to vertical baffle 120.

In another embodiment, as shown in FIG. 2B, vane 140 may be provided with a horizontal orientation.

Stormwater treatment device 100 may be configured to cause the water flow within stormwater treatment device 100 to change direction several times. The purpose of the direction changes is to optimize the time that the stormwater spends within stormwater treatment device 100. Because gravity settling takes time, because volume and flow may be limited by the dimensions of stormwater treatment device 100, this direction changes use the volume within stormwater treatment device 100 as effectively as possible.

Figure 9:
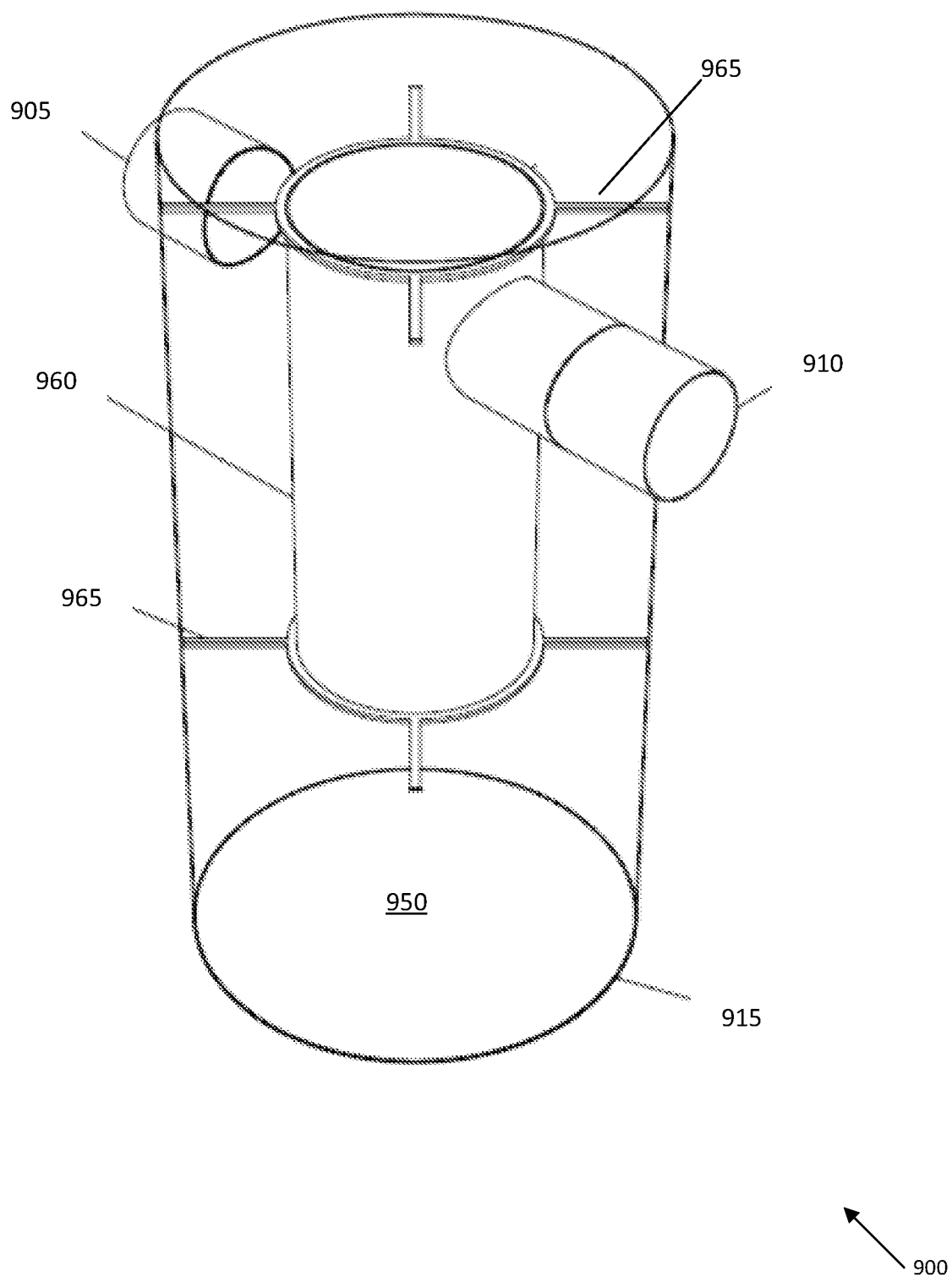
FIG. 9 depicts an isometric view of a stormwater treatment device according to another embodiment.
Figure 10:
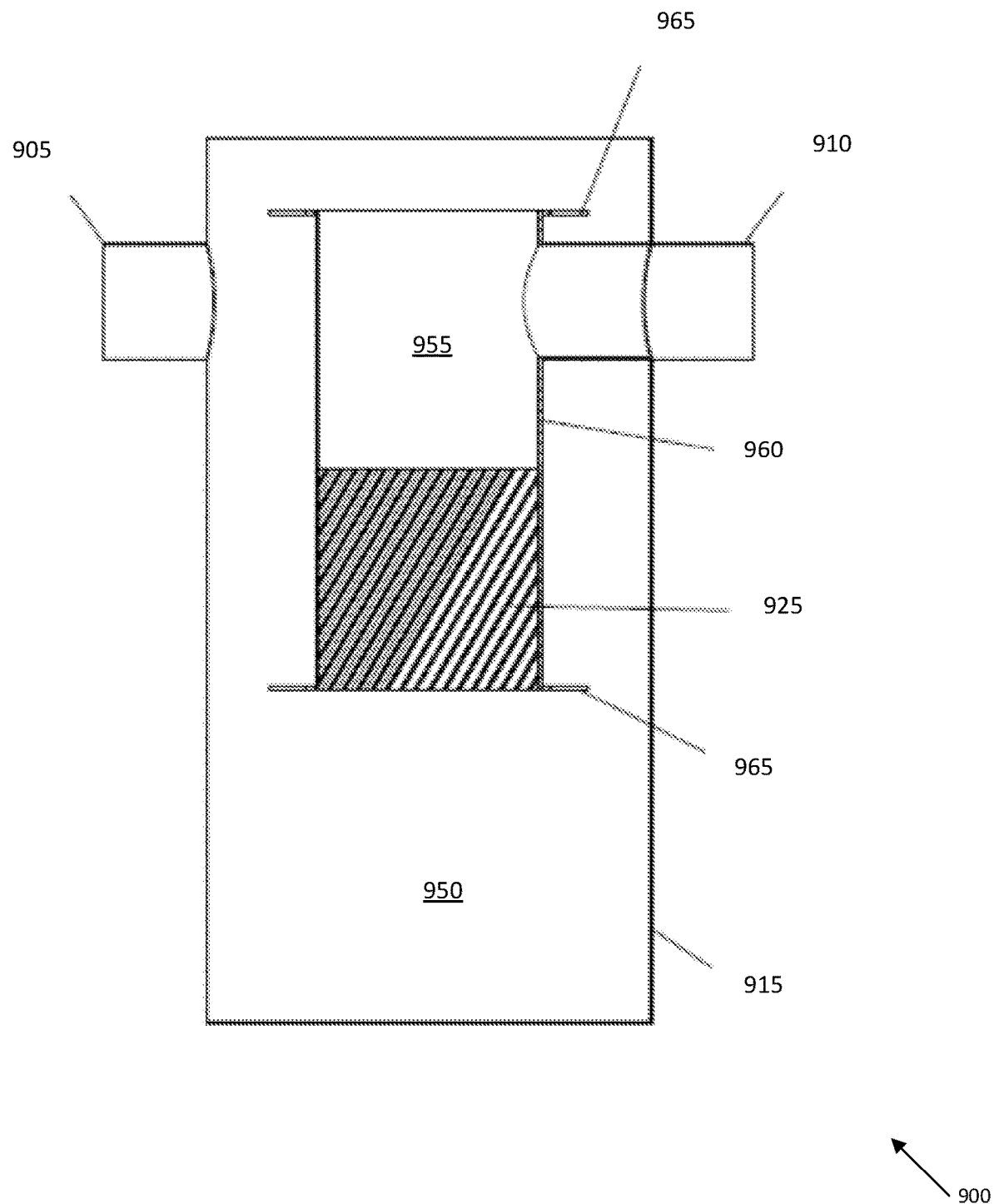
FIG. 10 depicts a side view of a stormwater treatment device according to the embodiment of FIG. 9 showing the interior of the inner chamber.

Referring to FIGS. 9 and 10, an isometric view and a sectional view of a stormwater treatment device are provided, respectively, according to another embodiment. Stormwater treatment device 900 may define a chamber including inlet 905, outlet 910, wall 915, inner chamber wall 960, and supports 965. In one embodiment, stormwater carrying contaminants may enter inlet 905 and may fall to outer chamber 950 of stormwater treatment device 900. The stormwater may then flow through enhanced settling device 925 into inner chamber 955 of stormwater treatment device 900 and may then exit via outlet 910.

It should be recognized that in an alternate embodiment, enhanced settling device 925 may be provided in outer chamber 950 of stormwater treatment device, and stormwater may be provided to inner chamber 965 of stormwater treatment device 900 via inlet 905. Outlet 910 may be provided for outer chamber 950, so that when stormwater flows through enhanced settling device 925, it exits stormwater treatment device 900 via outlet 910.

Enhanced settling device 925 may be similar to enhanced settling device 125, described above.

Figure 11:
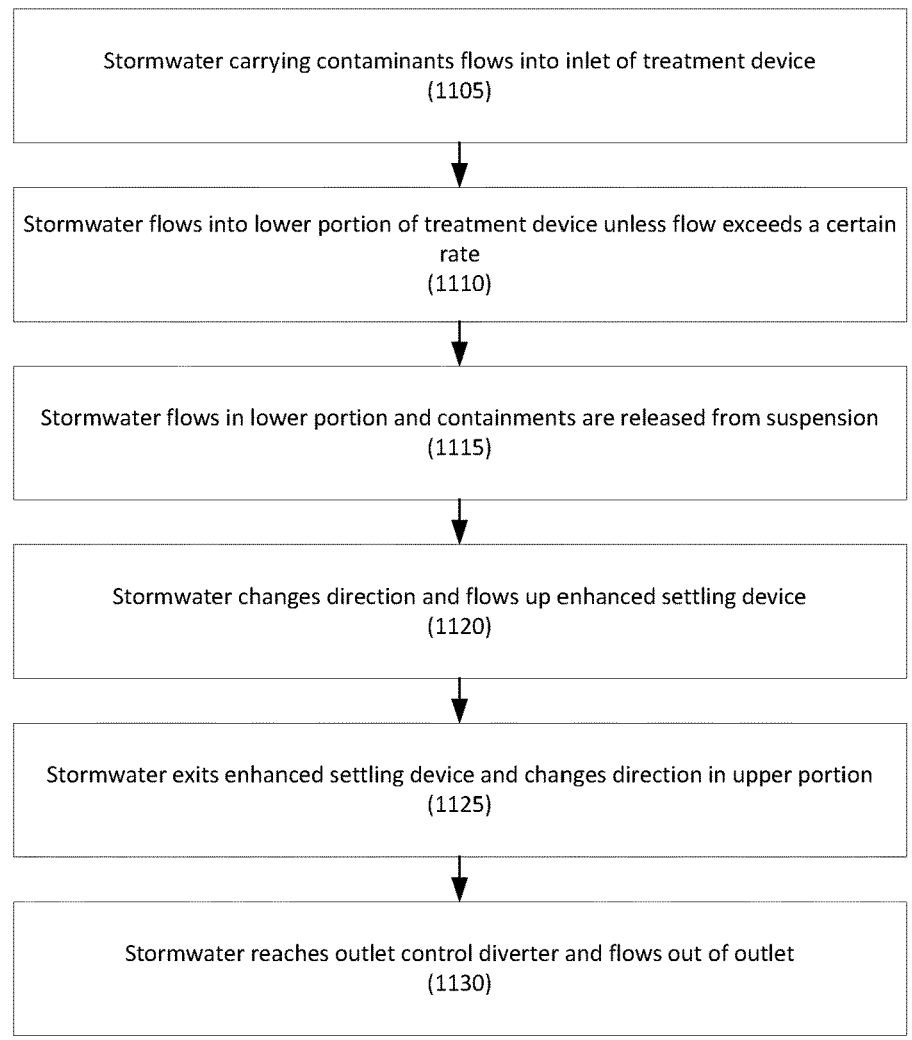
FIG. 11 depicts a method for removing contaminants from stormwater according to one embodiment.

Referring to FIG. 11, a method for removing contaminants from stormwater is disclosed according to one embodiment.

In step 1105, stormwater carrying contaminants flows into the inlet side of the stormwater treatment device where an expansion allows the fluid velocity to decrease.

In step 1110, the stormwater flows into a lower portion of the stormwater treatment device unless flow exceeds a certain design flow rate. For example, if the flow is above a certain design flow rate, a quantity of stormwater proportional to the amount of flow above a certain design flow rate will flow over a baffle and directly to an upper portion of the stormwater treatment device while the remainder of the flow will flow into the lower portion of the stormwater treatment device.

In step 1115, the stormwater flows into a lower portion and containments may be released from suspension due to gravity settling. Settled contaminants will accumulate in the lower portion of the stormwater treatment device.

In step 1120, the stormwater changes direction and may flow up an enhanced settling device, such as lamellar tubes. These tubes provide a shorter settling distance, which reduces the time required for settling. This facilitates the settling of smaller particles. Particles settled in the enhanced settling device will eventually fall into the lower portion of the stormwater treatment device.

In step 1125, the stormwater exits the enhanced settling device and changes direction in an upper portion of the stormwater treatment device.

In step 1130, the stormwater reaches an outlet flow diverter and may flow out of the outlet. In one embodiment, the structure of the outlet flow diverter may cause the stormwater to change direction again before exiting via the outlet.

It will be appreciated by persons skilled in the art that the present invention is not limited by what has been particularly shown and described hereinabove. Rather the scope of the present invention includes both combinations and subcombinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A stormwater treatment device, comprising:
   a chamber having a floor and a wall;
   an inlet formed in the wall that receives stormwater into an inlet side of the chamber;
   an outlet formed in the wall that discharges stormwater from an outlet side of the chamber;
   a vertical baffle that divides at least a portion of the chamber into the inlet side and the outlet side, wherein the inlet side and the outlet side are in fluid communication;
   a plurality of substantially vertical vanes positioned on the vertical baffle, wherein the plurality of substantially vertical vanes extend into the inlet side of the chamber;
   an enhanced settling device positioned in the outlet side of the chamber, wherein a portion of the chamber below a bottom of the enhanced settling device defines a lower portion of the chamber, and a portion of the chamber above a top of the enhanced settling device defines an upper portion of the chamber;
   a flow diverter plate in the lower portion of the chamber; and
   an outlet control diverter positioned proximate to the outlet;
   wherein stormwater is received by the inlet in a first flow direction, flows from the inlet side to the lower portion of the chamber in a second flow direction, flows through the enhanced settling device to an upper portion of the chamber in a third flow direction, flows through the outlet control diverter in a fourth flow direction, and is discharged by the outlet in a fifth flow direction.

2. The stormwater treatment device of claim 1, further comprising:
a horizontal vane positioned on the vertical baffle, wherein the horizontal vane extends into the inlet side of the chamber.

3. The stormwater treatment device of claim 2, further comprising a plurality of additional vertical vanes, wherein the additional vertical vanes extend from ends of the horizontal vane.

4. The stormwater treatment device of claim 1, wherein a top of the enhanced settling device is below a lower surface of the outlet control diverter.

5. The stormwater treatment device of claim 1, wherein the outlet control diverter comprises a bottom piece and two vertical side pieces, wherein an opening for receiving stormwater is defined by the bottom piece, one of the vertical side pieces, and the wall.

6. The stormwater treatment device of claim 1, wherein the vertical baffle, the enhanced settling device, the flow diverter plate, and the outlet control diverter are configured to optimize a time the stormwater spends in the chamber.

7. The stormwater treatment device of claim 1, wherein the chamber is cylindrical.

8. The stormwater treatment device of claim 1, wherein the chamber is rectangular.

9. A stormwater treatment device, comprising:
a chamber having a floor and a wall;
an inlet formed in the wall that receives stormwater into an inlet side of the chamber;
an outlet formed in the wall that discharges stormwater from an outlet side of the chamber;
a vertical baffle that divides at least a portion of the chamber into the inlet side and the outlet side, wherein the inlet side and the outlet side are in fluid communication, wherein the vertical baffle is has a height such that stormwater having a flow rate above a certain value flows over the vertical baffle;
an enhanced settling device positioned in the outlet side of the chamber, wherein a portion of the chamber below a bottom of the enhanced settling device defines a lower portion of the chamber, and a portion of the chamber above a top of the enhanced settling device defines an upper portion of the chamber;
a flow diverter plate in the lower portion of the chamber; and
an outlet control diverter positioned proximate to the outlet;

wherein stormwater is received by the inlet in a first flow direction, flows from the inlet side to the lower portion of the chamber in a second flow direction, flows through the enhanced settling device to an upper portion of the chamber in a third flow direction, flows through the outlet control diverter in a fourth flow direction, and is discharged by the outlet in a fifth flow direction.

10. A method for removing suspended contaminants from stormwater, comprising:
receiving, at an inlet of a stormwater treatment device having a chamber, stormwater comprising suspended contaminants, wherein the stormwater flows in a first flow direction into an inlet side of the stormwater treatment device and a fluid velocity of the stormwater decreases, wherein stormwater having a flow rate above a certain value flows over a vertical baffle that divides at least a portion of the chamber into the inlet side and the outlet side, wherein the inlet side and the outlet side are in fluid communication;
receiving, in a lower portion of the stormwater treatment device, the stormwater;
receiving, in an enhanced settling device, the stormwater from the lower portion, wherein the stormwater flows in a second flow direction that is different from the first flow direction to flow up the enhanced settling device into an upper portion of the chamber on an outlet side of the chamber;
receiving, at an outlet control diverter, the stormwater from the upper portion, wherein the stormwater flows in a third flow direction that is different from the second flow direction so as to be received by the outlet control diverter; and
discharging, at an outlet, the stormwater.

11. The method of claim 10, wherein a top of the enhanced settling device is below a lower surface of the outlet control diverter.

12. The method of claim 10, wherein the outlet control diverter comprises a bottom piece and two vertical side pieces, wherein an opening for receiving stormwater is defined by the bottom piece, one of the vertical side pieces, and an outer wall of the stormwater treatment device.

13. The method of claim 10, wherein the changes in the flow direction, the second flow direction, and the third flow direction optimize a time the stormwater spends in the chamber.

14. The method of claim 10, wherein the chamber is cylindrical.

15. The method of claim 10, wherein the chamber is rectangular.

* * * * *